(12) United States Patent
Misaka

(10) Patent No.: US 7,929,806 B2
(45) Date of Patent: Apr. 19, 2011

(54) IMAGE READING APPARATUS AND IMAGE READING METHOD

(75) Inventor: Naoyuki Misaka, Sunto-gun (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1112 days.

(21) Appl. No.: 11/670,703

(22) Filed: Feb. 2, 2007

(65) Prior Publication Data
US 2008/0187243 A1 Aug. 7, 2008

(51) Int. Cl.
*G06K 9/32* (2006.01)
(52) U.S. Cl. ......... 382/299; 382/162; 382/298; 358/1.2; 358/525
(58) Field of Classification Search .......... 382/162–167; 358/1.2, 525
See application file for complete search history.

(56) References Cited

U.S. PATENT DOCUMENTS

| | | | |
|---|---|---|---|
| 6,697,166 B1 * | 2/2004 | Minamizawa | 358/1.2 |
| 7,190,486 B2 * | 3/2007 | Tabata et al. | 358/1.9 |
| 7,256,380 B2 * | 8/2007 | Kamisuwa et al. | 250/208.1 |

FOREIGN PATENT DOCUMENTS
JP 2003-087556 3/2003
* cited by examiner

Primary Examiner — Wesley Tucker
(74) Attorney, Agent, or Firm — Turocy & Watson, LLP

(57) ABSTRACT

In an image reading apparatus capable of converting the resolution of an image read by a color line sensor by using an image read by a monochrome sensor, a technique that realizes proper use of resolution conversion processing in accordance with the type of the image on the reading target is provided.

An image reading apparatus includes: a first image reading unit configured to carry out monochrome image reading with a first resolution from a reading target; a second image reading unit configured to carry out color image reading from the reading target, with a second resolution that is lower than the first resolution; a type determining unit configured to determine whether the image on the reading target is of a first image type for which luminance resolution is given priority, or of a second image type for which color reproducibility is given priority; and a processing executing unit configured to, when it is determined by the type determining unit that the image is of the first image type, execute resolution conversion processing to raise the resolution of image data read by the second image reading unit by using image data read by the first image reading unit.

18 Claims, 15 Drawing Sheets

PIXEL SIZE OF RED/GREEN/BLUE

PIXEL SIZE OF BLACK

IMAGE READING APPARATUS AND IMAGE READING METHOD

BACKGROUND OF THE INVENTION

1. Field of the Invention

The present invention relates to an image processing technique in an image reading apparatus, and particularly to an adaptation technique for image processing that is carried out in accordance with the image type on an original.

2. Description of the Related Art

Traditionally, in an image reading apparatus capable of reading a color image, a three-line CCD sensor formed by three lines including a red line sensor, a green line sensor and a blue line sensor is generally employed. The three-line CCD sensor has a configuration in which three one-dimensional line sensors are arrayed, having red, green and blue color filters arranged on their respective light receiving surfaces.

Also, in addition to the three-line CCD sensor provided in the traditional image reading apparatus, a four-line CCD sensor having a four-line configuration for reading a monochrome image has recently been disclosed, in which a monochrome reading line sensor with no color filter arranged on its light receiving surface is additionally provided.

In a traditional image reading apparatus having the four-line CCD sensor, the reading resolution of the monochrome reading line sensor is set to be higher than the reading resolution of the color reading line sensors. Thus, a low-resolution image read by the color line sensors can be converted to high resolution by using high-resolution image data read by the monochrome line sensor.

Originals from which images are to be read in the image reading apparatus are roughly classified into character images and line drawing images for which luminance resolution should be given priority, and photographic images for which color reproducibility should be given priority.

In the traditional image reading apparatus having the four-line CCD line sensor, in the case of converting the resolution of an image read by the color line sensors with an image read by the monochrome sensor, the resolution of the color image can be raised, but it may cause adverse effects (for example, color imbalance or the like) on the color reproducibility such as color balance of the color image data.

Such effects on the color reproducibility should be restrained to the minimum in the case of an image for which color reproducibility is emphasized, like a photographic image. The use of image processing must be properly distinguished in accordance with the image type of the original.

SUMMARY OF THE INVENTION

It is an object of an aspect of the invention to provide a technique for realizing proper distinction of the use of resolution conversion processing in accordance with the type of image on a reading target, in the image reading apparatus capable of converting the resolution of an image read by the color line sensor with an image read by the monochrome sensor.

To overcome the above problems, an image reading apparatus according to an aspect of the invention includes: a first image reading unit configured to carry out monochrome image reading with a first resolution from a reading target; a second image reading unit configured to carry out color image reading from the reading target, with a second resolution that is lower than the first resolution; a type determining unit configured to determine whether the image on the reading target is of a first image type for which luminance resolution is given priority, or of a second image type for which color reproducibility is given priority; and a processing executing unit configured to, when it is determined by the type determining unit that the image is of the first image type, execute resolution conversion processing to raise the resolution of image data read by the second image reading unit by using image data read by the first image reading unit.

Also, an image reading apparatus according to an aspect of the invention includes: first image reading means for carrying out monochrome image reading with a first resolution from a reading target; second image reading means for carrying out color image reading from the reading target, with a second resolution that is lower than the first resolution; type determining means for determining whether the image on the reading target is of a first image type for which luminance resolution is given priority, or of a second image type for which color reproducibility is given priority; and processing executing means for, when it is determined by the type determining means that the image is of the first image type, executing resolution conversion processing to raise the resolution of image data read by the second image reading means by using image data read by the first image reading means.

Also, an image reading method according to an aspect of the invention includes the step of: carrying out monochrome image reading with a first resolution from a reading target; carrying out color image reading from the reading target, with a second resolution that is lower than the first resolution; determining whether the image on the reading target is of a first image type for which luminance resolution is given priority, or of a second image type for which color reproducibility is given priority; and when it is determined in the step of determining that the image is of the first image type, executing resolution conversion processing to raise the resolution of image data read in the step of carrying out color image reading by using image data read in the step of carrying out monochrome image reading.

DESCRIPTION OF THE EMBODIMENTS

Hereinafter, embodiments of the invention will be described with reference to the drawings.

First Embodiment

A first embodiment of the invention will now be described.

It is assumed that an image reading apparatus M according to the embodiment is, for example, a multi function peripheral (MFP).

Figure 1:
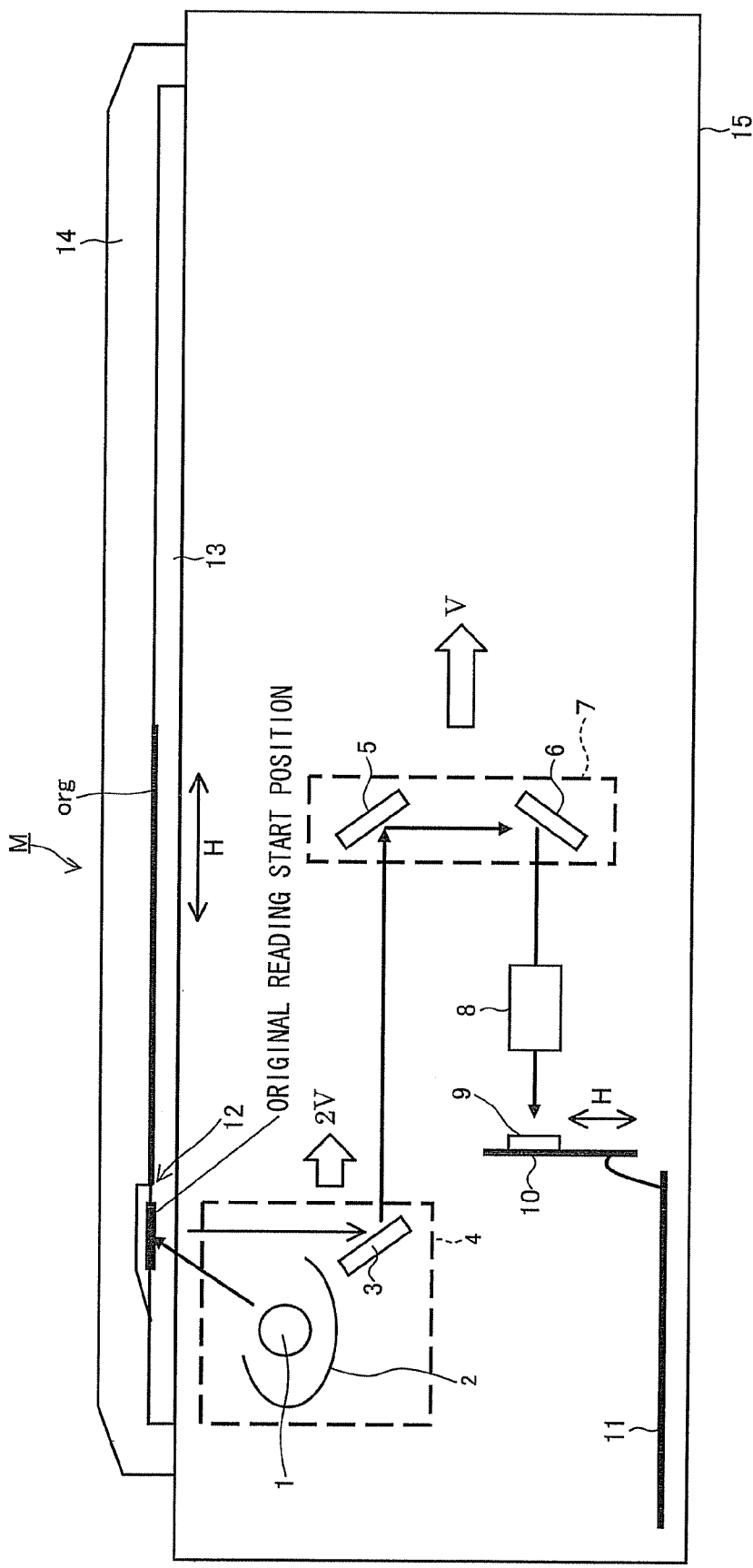
FIG. 1 is a schematic configuration view for explaining the schematic configuration of an image reading apparatus M according to a first embodiment of the invention.

FIG. 1 is a schematic configuration view for explaining the schematic configuration of the image reading apparatus M according to the first embodiment of the invention.

The image reading apparatus M according to the embodiment has a light source 1, a reflector 2 that corrects the luminous intensity distribution of the light source 1, a first mirror 3, a second mirror 5, a third mirror 6, a condensing lens 8, a CCD line sensor 9, a control board 11 that controls the CCD line sensor 9 and carries out various processing, a white reference board 12 to provide a white reference, an original glass 13 for setting an original org thereon, an original holding cover 14 for fixing the original org so that it will not float, and a scanner casing 15 for arranging all the above components therein.

The light source 1, the reflector 2 and the first mirror 3 form a first carriage 4. The second mirror 5 and the third mirror 6 form a second carriage 7. Also, the CCD line sensor 9 is mounted on a CCD sensor board 10. The first carriage 4, the second carriage 7 and the condensing lens 8 form a scanning optical system. In this scanning optical system, the first carriage 4 and the second carriage 7 are movable in a sub-scanning direction (H direction that is in the horizontal direction in FIG. 1). The first carriage 4 is to move at a moving speed (2V) that is twice the moving speed (V) of the second carriage 7.

First, an outline of the operation of the image reading apparatus M according to the embodiment will be described with reference FIG. 1.

Light cast from the light source 1 is transmitted through the original glass 13 and cast onto the original org. Here, the luminous intensity distribution of the light cast from the light source 1 is not even, and uneven luminous intensity distribution occurs in the illumination on the original org. Therefore, also the reflected light from the reflector 2 is cast onto the original org, thereby realizing even luminous intensity distribution on the original org.

The reflected light from the original org is reflected by the first mirror 3, the second mirror 5 and the third mirror 6, is then transmitted through the condensing lens 8, and forms an image on a light receiving surface of the CCD line sensor 9. The CCD line sensor 9 is mounted on the CCD sensor board 10 and is controlled by a control signal inputted from the control board 11. The control board 11 will be later described in detail.

The original holding cover is to hold the reading surface of the original org set on the original glass 13 so that it is closely in contact with the original glass 13.

The configuration of the CCD line sensor 9 will be later described in detail. An analog signal outputted from the CCD line sensor 9 includes a high-frequency distortion due to the difference in conversion efficiency between the respective photoelectric conversion units, and a low-frequency distortion caused by aberration due to the face that it is a reducing optical system using the condensing lens 8. Therefore, data to serve as a reference is necessary for carrying out normalization correction. In the configuration shown in FIG. 1, the reference data is image data acquired when reading the white reference board 12.

Figure 2:
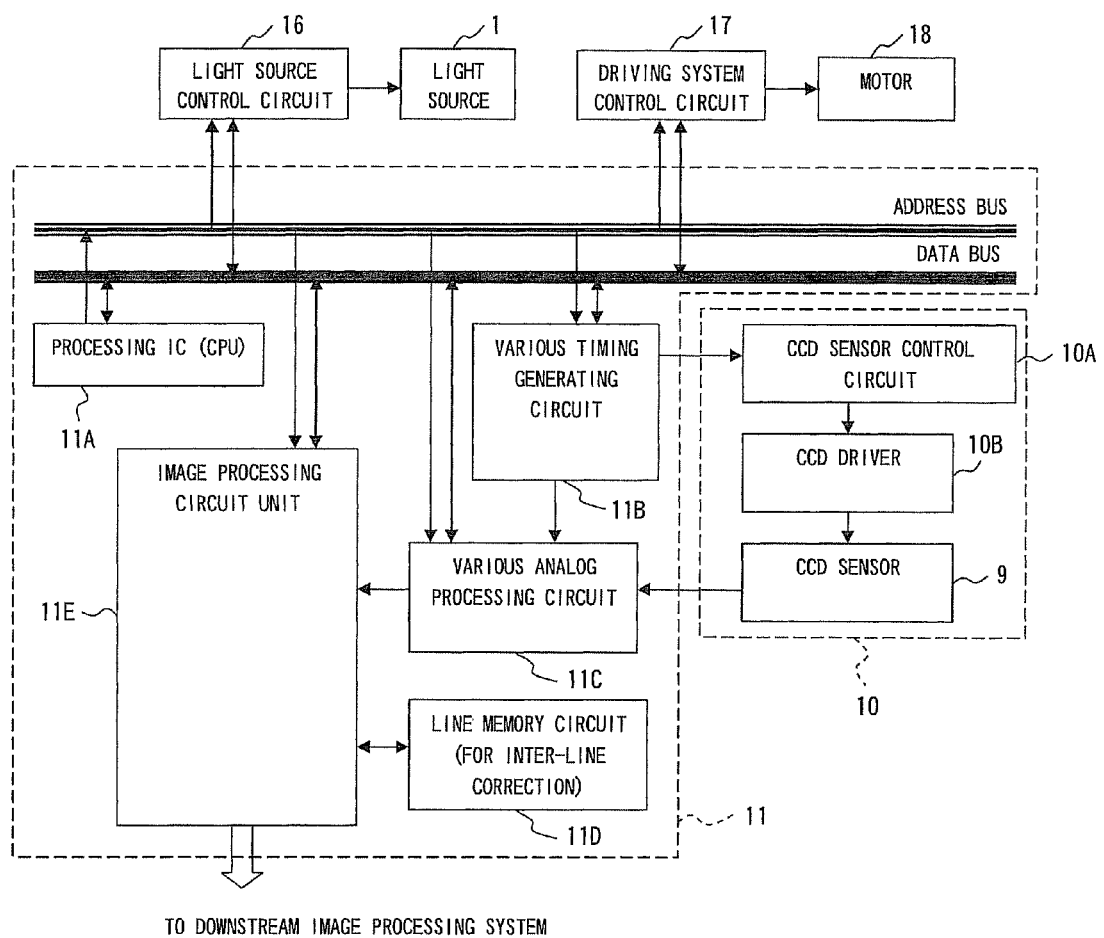
FIG. 2 is a view for explaining the configuration of a control board 11.

Next, the configuration of the control board 11 will be described in detail. FIG. 2 is a view for explaining the configuration of the control board 11.

The control board 11 includes a processing IC 11A that performs various processing, a various timing generating circuit 11B that generates various timing, a various analog processing circuit 11C that processes the analog signal from the CCD line sensor 9 and performs processing up to conversion of the analog signal to a digital signal, an image processing circuit unit 11E that performs image corrections such as shading correction to correct the high-frequency and low-frequency distortions and inter-line correction processing to correct a line position deviation between plural line sensors with respect to the digital signal outputted from the various analog processing circuit 11C, and a line memory circuit 11D for delaying image data by line when performing inter-line correction processing.

This processing IC 11A also controls a CCD sensor control circuit 10A mounted on the CCD sensor board 10, a light source control circuit 16 that performs light emission control of the light source 1, and a driving system control circuit 17 that controls a motor 18 for driving the first carriage 4 and the second carriage 7.

The CCD sensor board 10 includes the CCD line sensor 9, the CCD sensor control circuit 10A for driving the CCD line sensor 9, and a CCD driver 10B that receives an output of the CCD sensor control circuit 10A and adjusts it to the driving condition of the CCD line sensor 9.

Figure 3:
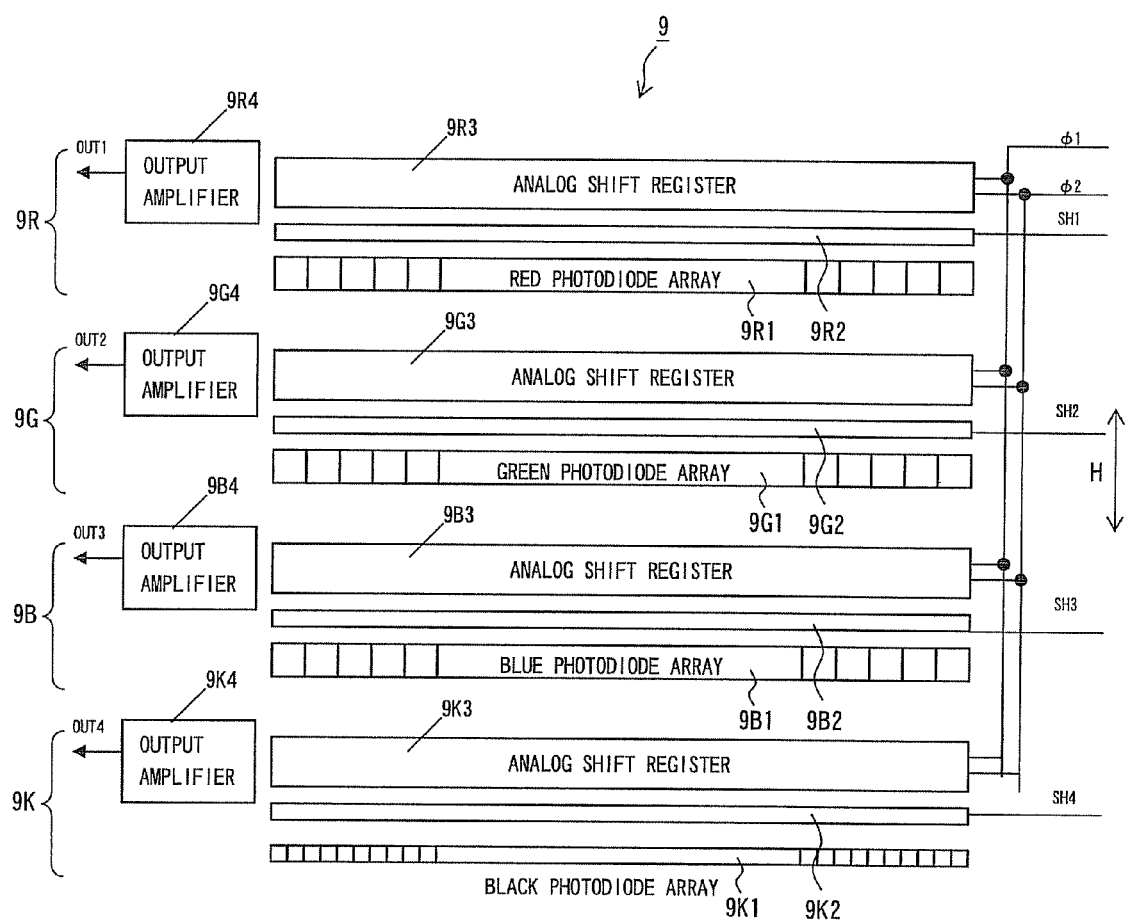
FIG. 3 is a schematic configuration view of a CCD line sensor 9 in the image reading apparatus M according to the first embodiment of the invention.

FIG. 3 is a schematic configuration view of the CCD line sensor 9 in the image reading apparatus M according to the first embodiment of the invention. The CCD line sensor 9 includes four line sensors, that is, a red line sensor 9R, a green line sensor 9G, a blue line sensor 9B, and a black line sensor 9K.

These four line sensors are arranged at difference positions from each other in the sub-scanning direction (H direction that is in the vertical direction in FIG. 1, corresponding to the sub-scanning direction in which the scanning optical system moves). As shown in FIG. 3, each line sensor includes a photodiode array, a shift gate, an analog shift register, and an output amplifier.

First, in the red line sensor 9R, light is converted to the quantity of electric charges corresponding to the quantity of incident light by photoelectric conversion in a red photodiode array 9R1 having a red color filter, not shown, arranged on its light receiving surface, and the charges are accumulated in each photodiode. The accumulated charges pass through a shift gate 9R2 in accordance with a control signal SH1 applied to the shift gate 9R2, and are transferred to an analog shift register 9R3. The charges transferred to the analog shift register 9R3 sequentially move toward a downstream output amplifier 9R4 in accordance with control signals $\phi1$ and $\phi2$, and are outputted outward from the output amplifier 9R4. The output signal at this point is referred to as OUT1.

In the green line sensor 9G, light is similarly converted to the quantity of electric charges corresponding to the quantity of incident light by photoelectric conversion in a green photodiode array 9G1 having a green color filter, not shown, arranged on its light receiving surface, and the charges are accumulated in each photodiode. The accumulated charges pass through a shift gate 9G2 in accordance with a control signal SH2 applied to the shift gate 9G2, and are transferred to an analog shift register 9G3. The charges transferred to the analog shift register 9G3 sequentially move toward a downstream output amplifier 9G4 in accordance with control signals $\phi1$ and $\phi2$, and are outputted outward from the output amplifier 9G4. The output signal at this point is referred to as OUT2.

Similarly, in the blue line sensor 9B, light is converted to the quantity of electric charges corresponding to the quantity of incident light by photoelectric conversion in a blue photodiode array 9B1 having a blue color filter, not shown, arranged on its light receiving surface, and the charges are accumulated in each photodiode. The accumulated charges pass through a shift gate 9B2 in accordance with a control signal SH3 applied to the shift gate 9B2, and are transferred to an analog shift register 9B3. The charges transferred to the analog shift register 9B3 sequentially move toward a downstream output amplifier 9B4 in accordance with control signals $\phi1$ and $\phi2$, and are outputted outward from the output amplifier 9B4. The output signal at this point is referred to as OUT3.

Similarly, in the black line sensor 9K, light is converted to the quantity of electric charges corresponding to the quantity of incident light by photoelectric conversion in a black photodiode array 9K1 having no color filter arranged on its light receiving surface, and the charges are accumulated in each photodiode. The accumulated charges pass through a shift gate 9K2 in accordance with a control signal SH4 applied to the shift gate 9K2, and are transferred to an analog shift register 9K3. The charges transferred to the analog shift register 9K3 sequentially move toward a downstream output amplifier 9K4 in accordance with control signals $\phi1$ and $\phi2$, and are outputted outward from the output amplifier 9K4. The output signal at this point is referred to as OUT4.

Figure 4:
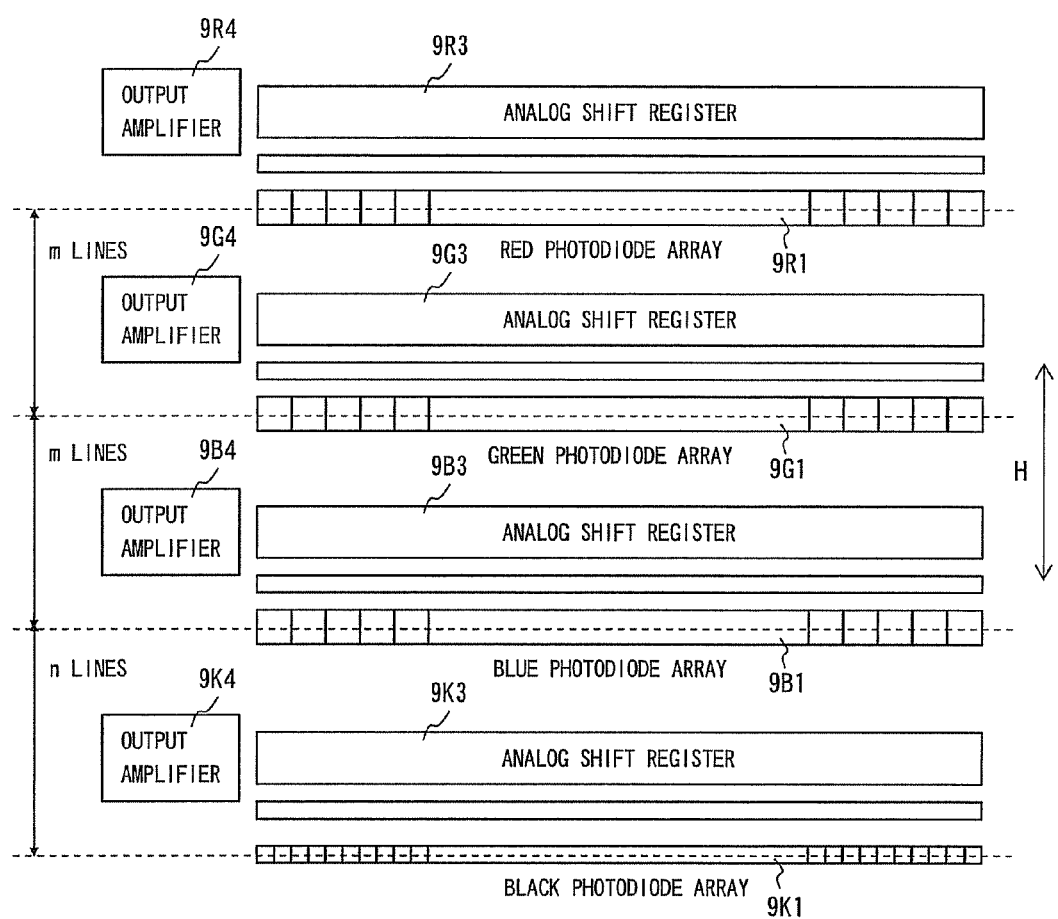
FIG. 4 is a view for explaining the layout of each photodiode array, shift gate, analog shift register, and output amplifier.

FIG. 4 is a view for explaining the layout of each of the photodiode arrays, the shift gate, the analog shift register, and the output amplifier.

As the distance between the respective photodiode arrays (the distance in the sub-scanning direction), the distance between the red photodiode array 9R1 and the green photodiode array 9G1 and the distance between the green photodiode array 9G1 and the blue photodiode array 9B1 are m lines, respectively. The distance between the blue photodiode array 9B1 and the black photodiode array 9K1 is n lines.

Here, the size (hereinafter referred to as pixel size) of the red photodiode array 9R1, the green photodiode array 9G1 and the blue photodiode array 9B1 is set to be larger than the pixel size of the black photodiode array 9K1. That is, the number of pixels in the red photodiode array 9R1, the green photodiode array 9G1 and the blue photodiode array 9B1 is smaller than the number of pixels in the black photodiode array 9K1.

Figure 5:
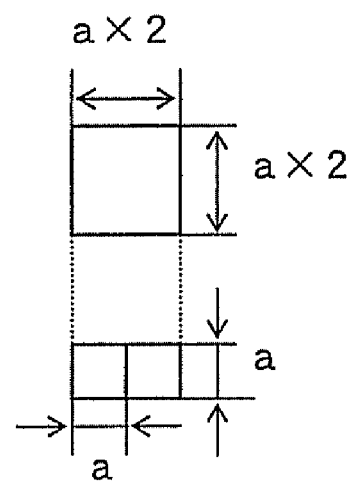
FIG. 5 is a view for explaining the pixel size of a photodiode array in the CCD line sensor in the embodiment.
Figure 6:
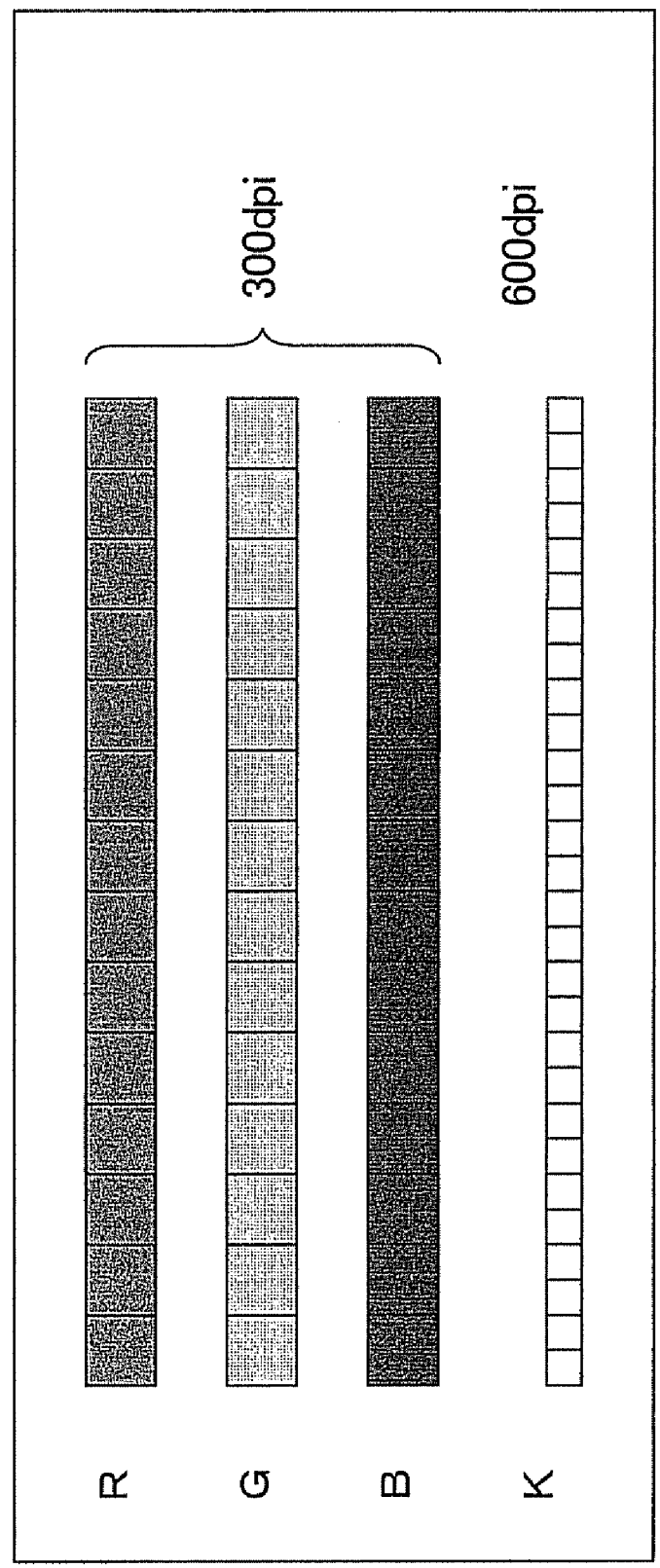
FIG. 6 is a schematic view showing the relation between the respective line sensors forming the four-line CCD line sensor 9.

FIG. 5 is a view for explaining the pixel sizes of the photodiode arrays in the CCD line sensor in the embodiment. FIG. 6 is a schematic view showing the relation between the respective line sensors forming the four-line CCD sensor 9.

In the embodiment, if it is assumed that the pixel size in the black photodiode array 9K1 is a×a and that the pixel size in each of the red photodiode array 9R1, the green photodiode array 9G1 and the blue photodiode array 9B1 is (a×2)×(a×2), as shown in FIG. 5, the number of pixels in each of the red photodiode array 9R1, the green photodiode array 9G1 and the blue photodiode array 9B1 is half the number of pixels in the black photodiode array 9K1 because the length in the longitudinal direction is the same in all the photodiode arrays.

In the case of reading the length of 297 mm, which is in the longitudinal direction of A4 size, by the black photodiode array 9K1 with a resolution of 600 dpi, it results in 600 (dpi)/25.4 (mm)×297 (mm)=7015.7. At least the number of pixels equal to or more than 7016 is necessary.

When an attachment error of the CCD line sensor 9, a position deviation of the place where the original org is set and the like are considered, the number of pixels need to be 7016+α. Therefore, the number of pixels in the black photodiode array 9K1 is set at 7500 in this example. In this case, the number of pixels in the green photodiode array 9G1, the blue photodiode array 9B1 and the black photodiode array 9K1 is 3750 pixels (half of 7500 pixels).

Next, the flow from conversion of the analog signal outputted from the CCD line sensor to a digital signal, up to image processing such as distortion correction (hereinafter referred to as shading correction) and inter-line correction, will be described.

Figure 7:
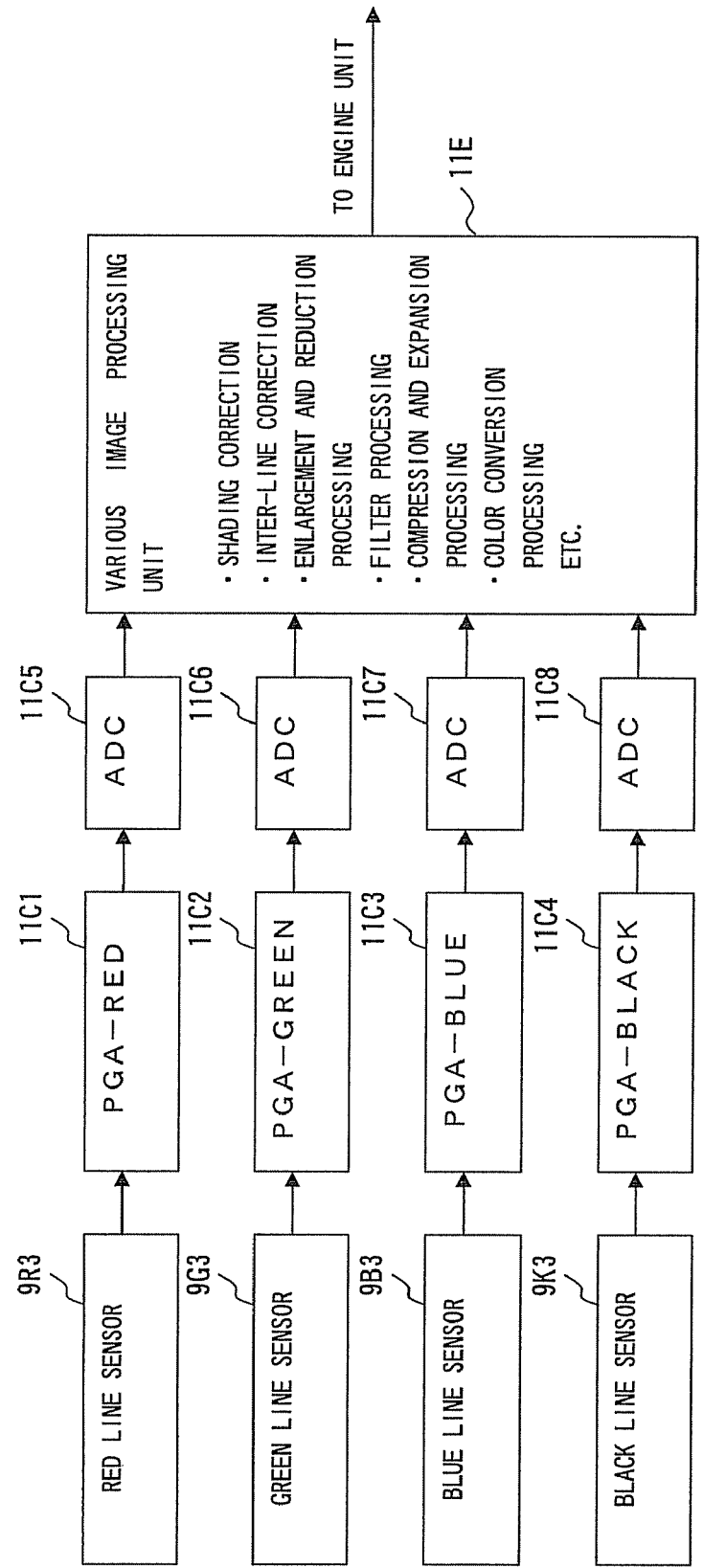
FIG. 7 is a view for explaining a flow of processing in the image reading apparatus according to the embodiment.

FIG. 7 is a view for explaining the flow of processing in the image reading apparatus according to the embodiment.

For the analog output signal OUT1 from the red line sensor shown in FIG. 3, the DC signal component included in the output signal from the CCD line sensor is removed by a coupling capacitor arranged in series, not shown. After that, the analog signal component is stabilized by a sample hold circuit, not shown. The amplitude of the analog signal thus stabilized is adjusted by a gain amplifier circuit (PGA-RED in FIG. 7) 11C1 in which an amplification factor can be set by an external signal. Then, the analog signal is converted to a digital signal by a downstream A/D converter (ADC in FIG. 7) 11C5 that converts an analog signal to a digital signal. The image signal converted to the digital signal is sent to the downstream various image processing unit 11E. PGA will be later described in detail.

Similarly, for the analog output signal OUT2 from the green line sensor, the DC signal component included in the output signal from the CCD line sensor is removed by a coupling capacitor arranged in series, not shown. After that, the analog signal component is stabilized by a sample hold circuit, not shown. The amplitude of the analog signal thus stabilized is adjusted by a gain amplifier circuit (PGA-GREEN in FIG. 7) 11C2 in which an amplification factor can be set by an external signal. Then, the analog signal is converted to a digital signal by a downstream A/D converter (ADC in FIG. 7) 11C6 that converts an analog signal to a digital signal. The image signal converted to the digital signal is sent to the downstream various image processing unit 11E.

Similarly, for the analog output signal OUT3 from the blue line sensor, the DC signal component included in the output signal from the CCD line sensor is removed by a coupling capacitor arranged in series, not shown. After that, the analog signal component is stabilized by a sample hold circuit, not shown. The amplitude of the analog signal thus stabilized is adjusted by a gain amplifier circuit (PGA-BLUE in FIG. 7) 11C3 in which an amplification factor can be set by an external signal. Then, the analog signal is converted to a digital signal by a downstream A/D converter (ADC in FIG. 7) 11C7 that converts an analog signal to a digital signal. The image signal converted to the digital signal is sent to the downstream various image processing unit 11E.

Similarly, for the analog output signal OUT4 from the black line sensor, the DC signal component included in the output signal from the CCD line sensor is removed by a coupling capacitor arranged in series, not shown. After that, the analog signal component is stabilized by a sample hold circuit, not shown. The amplitude of the analog signal thus stabilized is adjusted by a gain amplifier circuit (PGA-BLACK in FIG. 7) 11C4 in which an amplification factor can be set by an external signal. Then, the analog signal is converted to a digital signal by a downstream A/D converter (ADC in FIG. 7) 11C8 that converts an analog signal to a digital signal. The image signal converted to the digital signal is sent to the downstream various image processing unit 11E.

The image processing unit 11E performs shading correction, inter-line correction, processing to correct the red, green and blue output signals by using the black output signal, and the like. The processed signals are sent to an engine unit.

Figure 8:
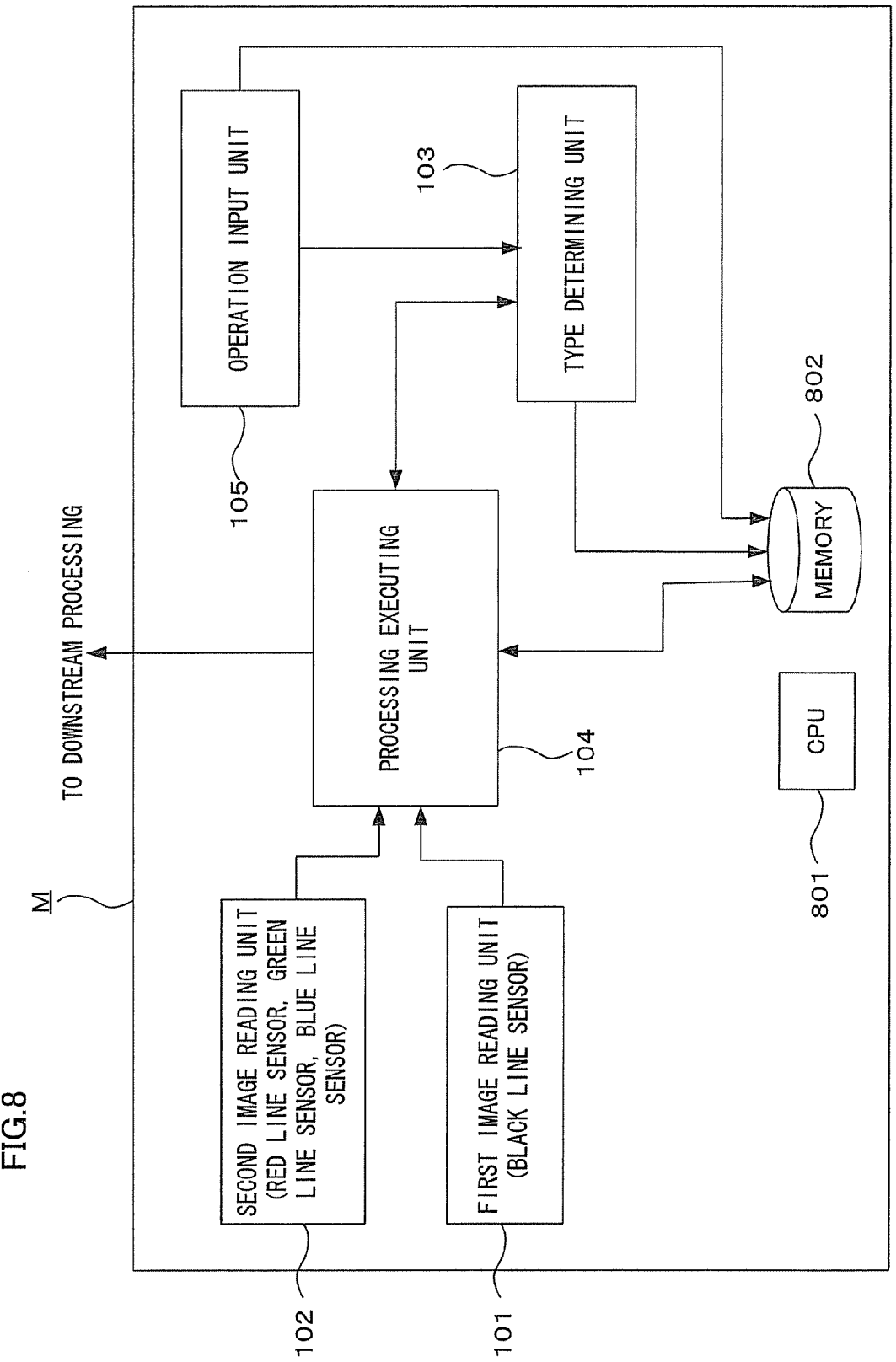
FIG. 8 is a functional block diagram for explaining the image reading apparatus M according to the embodiment.

FIG. 8 is a functional block diagram for explaining the image reading apparatus M according to the embodiment.

The image reading apparatus M according to the embodiment has a first image reading unit 101, a second image reading unit 102, a type determining unit 103, a processing executing unit 104, an operation input unit 105, a CPU 801, a memory 802, and a control unit 803.

The operation input unit 105 is formed by, for example, a touch panel display, a keyboard, a mouse and the like. It accepts an operation input from a user.

The first image reading unit 101 carries out monochrome image reading from a reading target with a first resolution (for example, 600 dpi).

The second image reading unit 102 carries out color (R, G, B) image reading from a reading target with a second resolution (for example, 300 dpi) that is lower than the first resolution.

The type determining unit 103 determines whether an image on the reading target is of a first image type for which luminance resolution is given priority or of a second type for which color reproducibility is given priority. Here, "an image of the first image type" refers to, for example, an image including characters or line drawing. "An image of the second image type" refers to, for example, an image including a photograph.

The type determining unit 103 determines whether the image type of the image on the reading target is the first image type or the second image type, via the control unit 803 in accordance with the operation input to the operation input unit 105. The result of the determination by the type determining unit 103 may, for example, be sent directly to the processing executing unit 104 via the control unit 803. Alternatively, it may be temporarily stored in the memory 802 via the control unit 803 and later referred to by the processing executing unit 104 via the control unit 803.

When it is determined by the type determining unit 103 that the image type is the first image type, the processing executing unit 104 executes resolution conversion processing to raise the resolution of the image data read by the second image reading unit 102 by using the image data read by the first image reading unit 101, Specifically, in this embodiment, the processing executing unit 104 raises the resolution of the image data read by the second image reading unit 102 to the "first resolution" by using the image data read by the first image reading unit 101 (resolution conversion processing).

The "predetermined resolution conversion processing" means the processing to separate the image data read by the second image reading unit 102 into a chromaticity signal and a luminance signal and to replace the luminance signal with the luminance signal of the image data read by the first image reading unit 101.

Generally, in the case of carrying out resolution conversion to raise the resolution of low-resolution color image data by using high-resolution monochrome image data, the resolution of the image can be raised but the color reproducibility such as color balance of the color image data may be adversely affected (for example, color imbalance or the like occurs).

Therefore, as in the configuration described in the embodiment, when the image type of the image on the reading target is of a "character mode", resolution conversion processing is performed on the image data read by he second image reading unit 102 so that luminance resolution is given priority, and the image data is thus outputted. When the image type of the image on the reading target is of a "photographic mode", resolution conversion processing is performed on the image data read by the second image reading unit 102 so that color reproducibility is given priority, and the image data is thus outputted. This enables proper image processing in accordance with the image type, and it can contribute to improvement in the reading image quality.

The CPU 801 serves to perform various processing in the image reading apparatus, and also serves to realize various functions by executing programs stored in the memory 802. The memory 802 is formed by, for example, a ROM, RAM or the like. It serves to store various kinds of information and programs to be used in the image reading apparatus.

Hereinafter, the processing in the image reading apparatus M according to the embodiment will be described in detail. The image reading apparatus M according to the embodiment is configured to change the processing content of image processing in the image processing unit 11E shown in FIG. 6, depending on whether the original org is a "character original" or "photographic original".

Figure 9:
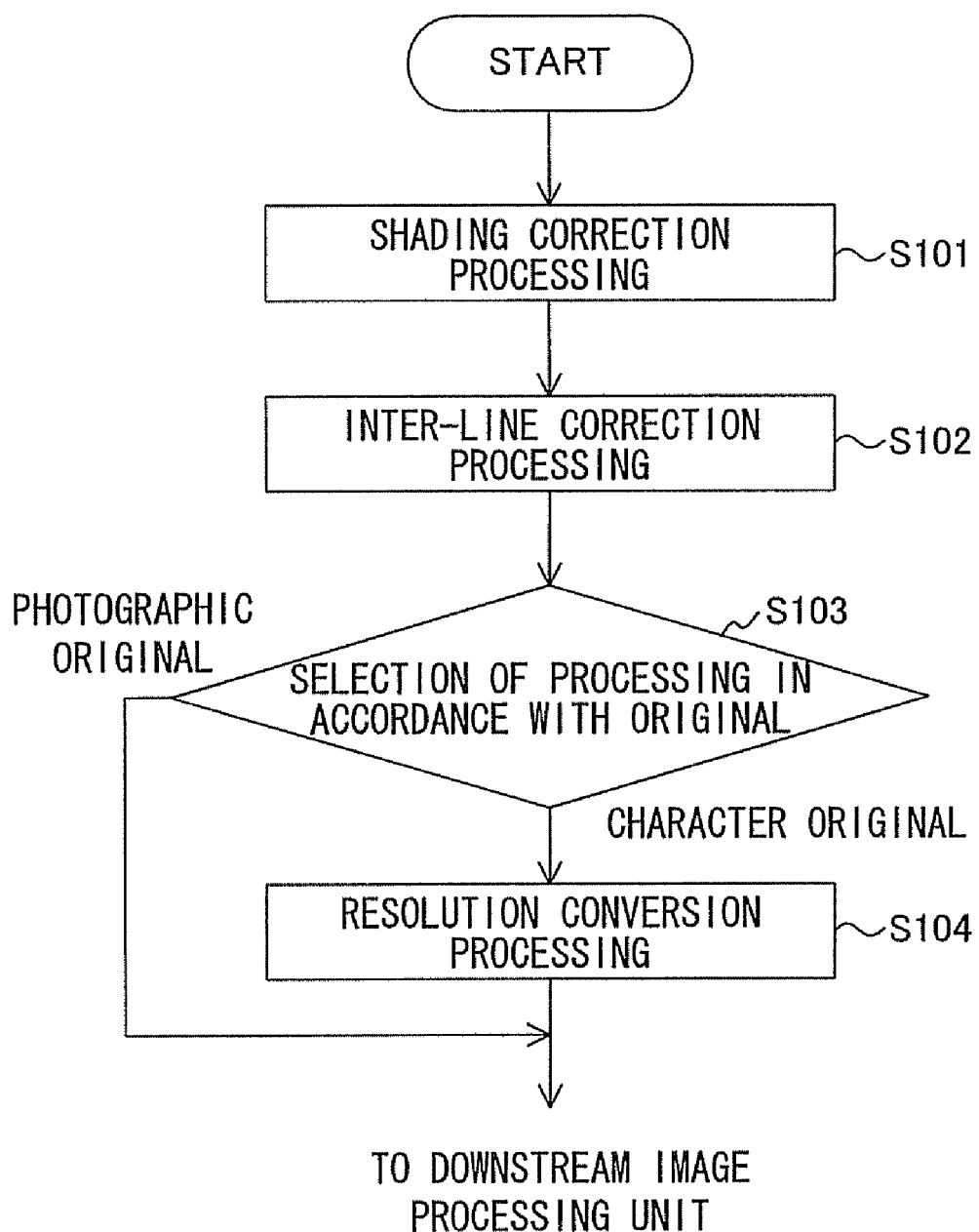
FIG. 9 is a flowchart showing the details of processing in the image processing apparatus according to the first embodiment of the invention.
Figure 10:
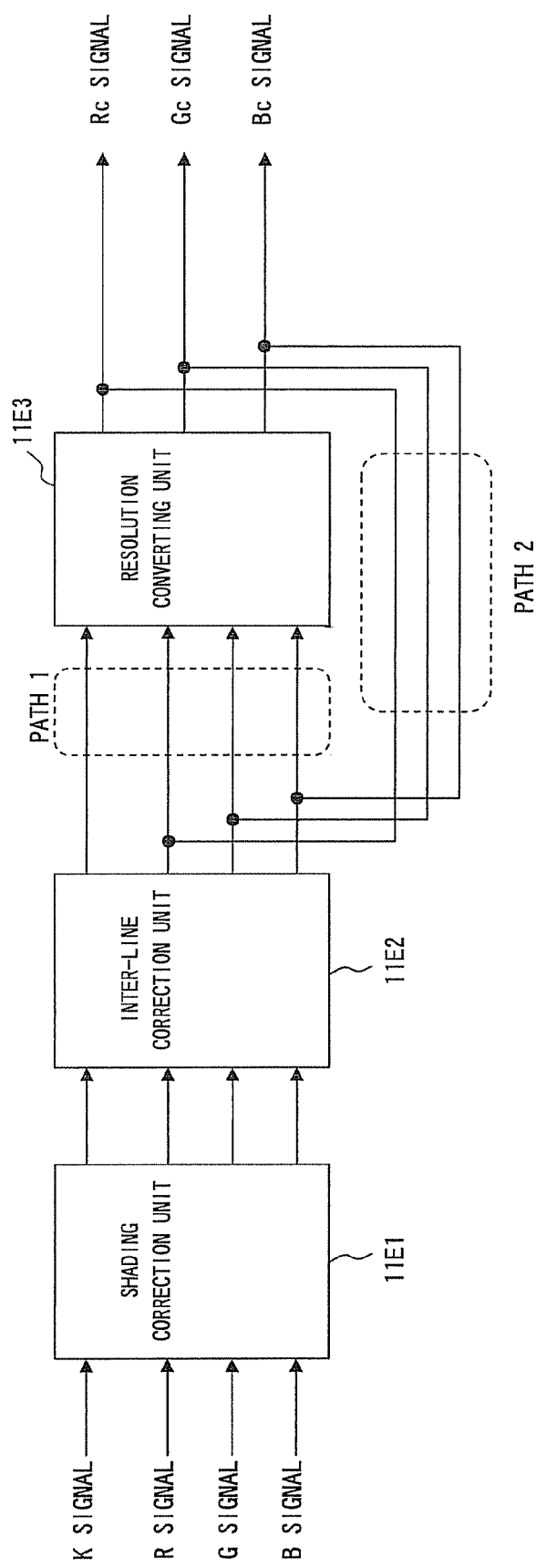
FIG. 10 is a view for explaining internal processing (processing in the flowchart of FIG. 9) in an image processing unit 11E.
Figure 11:
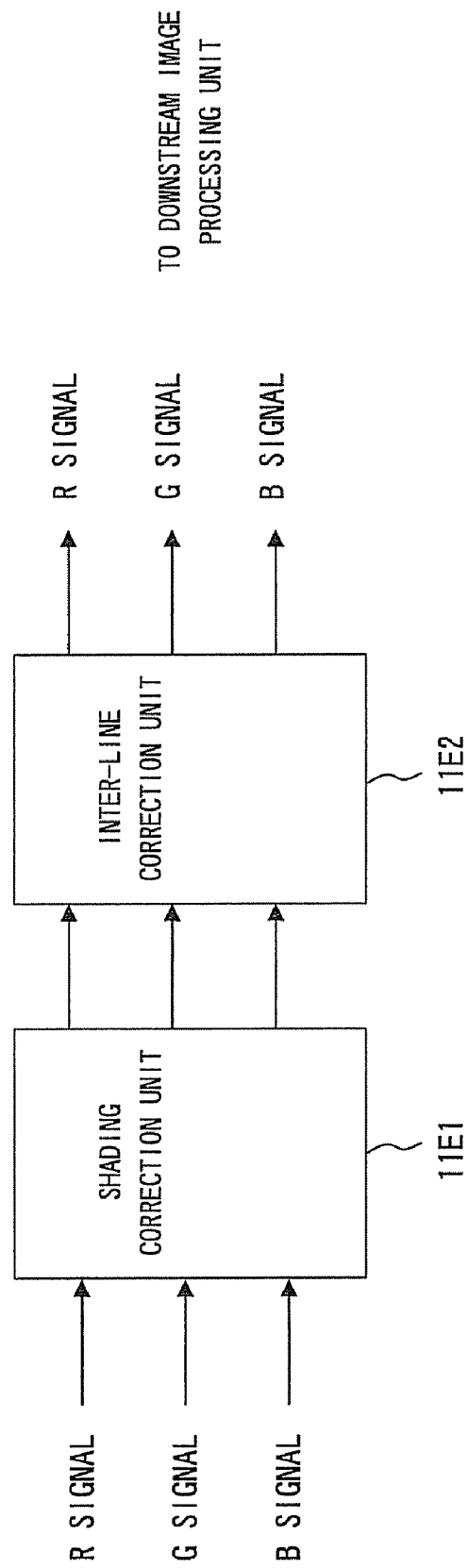
FIG. 11 is a view for explaining internal processing (processing in the flowchart of FIG. 9) in an image processing unit 11E.
Figure 12:
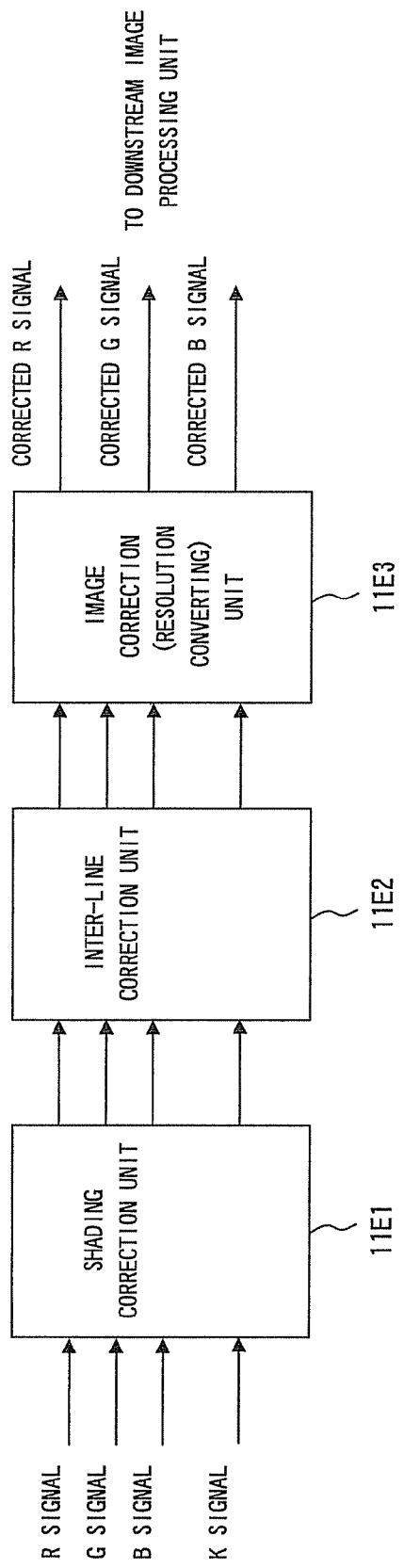
FIG. 12 is a view for explaining internal processing (processing in the flowchart of FIG. 9) in an image processing unit 11E.

FIG. 9 is a flowchart showing the details of the processing in the image processing apparatus according to the first embodiment. FIG. 10 to FIG. 12 are views for explaining the internal processing in the image processing unit 11E (the processing shown in the flowchart of FIG. 9).

Red, green, blue and black analog signals outputted from the four-line CCD sensor 9 are converted to digital signals and then sent to the image processing unit (equivalent to the processing executing unit) 11E, as shown in FIG. 10. First, a shading correction unit 11e1 carries out shading correction (distortion correction) (S101). Next, to correct the influence of the distance between the respective line sensors (position deviation), an inter-line correction unit 11E2 carries out inter-line correction processing (S102). Next, the processing executing unit 104 selects processing in accordance with the image type of the original (S103). When the original org is a "character original", the output signal is sent to a resolution converting unit 11E3 (S104). After that, the output signal is sent to the downstream image processing unit (see FIG. 12).

Specifically, when the original is a "character original", a "path 1" shown in FIG. 10 is taken. The K signal, R signal, G signal and B signal are inputted to the resolution converting unit 11E3, and the resolution converting unit 11E3 carries out resolution conversion processing. This resolution conversion processing is the processing to convert the resolution of the R signal, G signal and B signal on the basis of the resolution of the K signal. The Rc signal, Gc signal and Bc signal, on which resolution conversion processing has been performed, are sent to the downstream image processing unit (see FIG. 12).

On the other hand, when the original org is a "photographic original", the output signal is sent directly to the downstream image processing (see FIG. 11).

Specifically, when the original is a "photographic original", a "path 2" shown in FIG. 10 is taken. The R signal, G signal and B signal are not sent to the resolution converting unit 11E3 and they are sent as the Rc signal, Gc signal and Bc signal to the downstream image processing unit.

As this processing is used, in the case of a character original, the R signal, G signal and B signal read by the four-line CCD sensor are converted to the Rc signal, Gc signal and Bc signal, which are signals of higher resolution than the R signal, G signal and B signal, and they are sent to the downstream image processing unit. For a photographic original, the Rc signal, Gc signal and Bc signal having resolution equivalent to that of the R signal, G signal and B signal read by the four-line CCD sensor (the signals on which special resolution conversion processing has not been performed) are sent to the downstream image processing unit.

Figure 13:
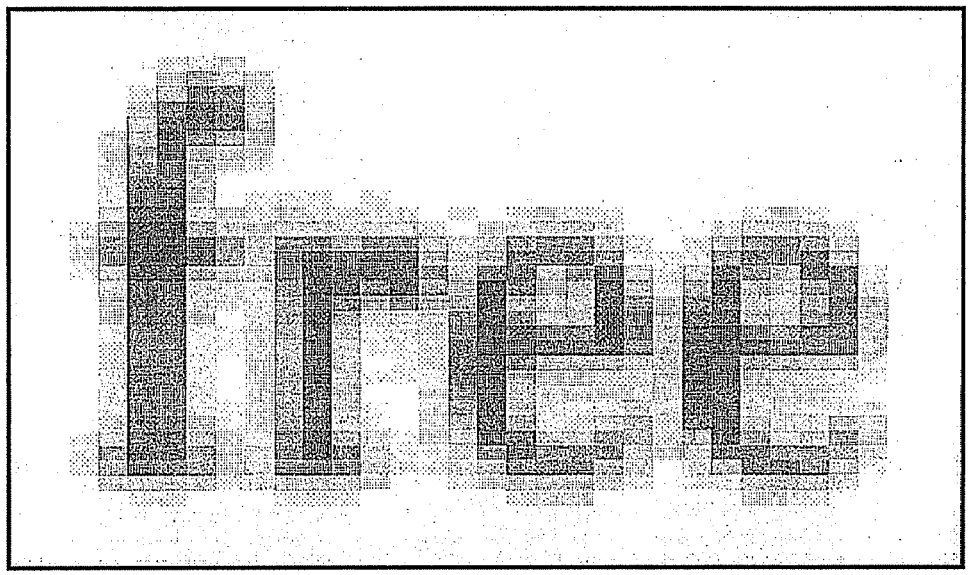
FIG. 13 is a view showing an output image in the case where resolution conversion processing is not carried out for a character original.
Figure 14:
FIG. 14 is a view showing an output image in the case where resolution conversion processing is carried out for a character original.

FIG. 13 is a view showing an output image in the case where resolution conversion processing is not carried out for a character original. FIG. 14 is a view showing an output image in the case where resolution conversion processing is carried out for a character original.

As FIG. 13 and FIG. 14 are compared with each other, it can be seen that the contours of the characters in FIG. 13 are not reproduced well and form a blurred image as a whole because the resolution is lower in FIG. 13 than in FIG. 14. On the other hand, in FIG. 14, as resolution conversion processing is carried out, an image of higher resolution than in FIG. 13 is formed and the contours of the characters are clearly reproduced.

Figure 15:
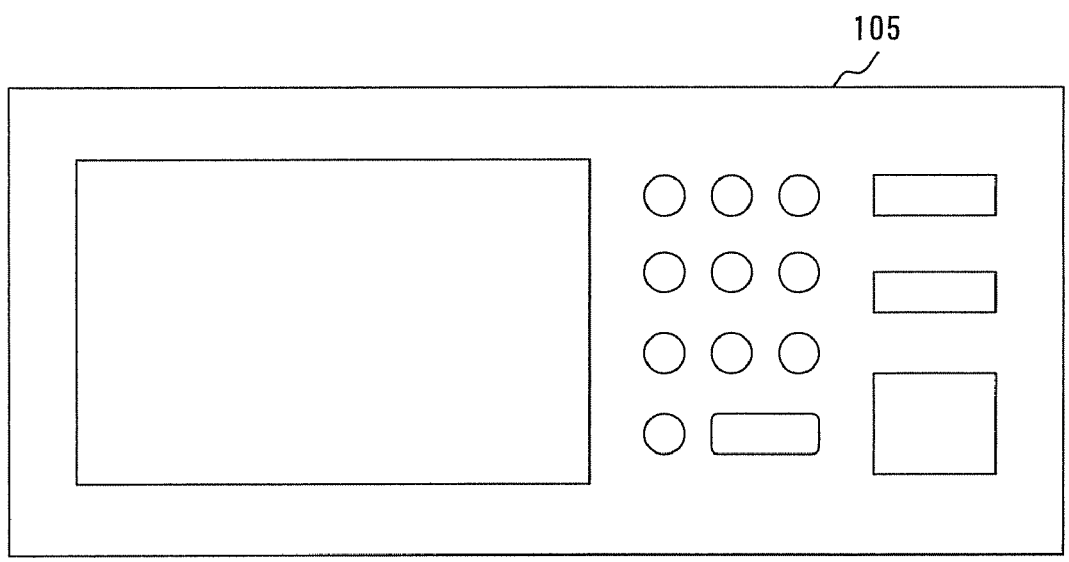
FIG. 15 is a schematic view of a control panel (equivalent to an operation input unit 105) in the image reading apparatus M according to the embodiment.

FIG. 15 is a schematic view of a control panel (equivalent to the operation input unit 105) in the image reading apparatus M according to the embodiment. By an operation input to this control panel, for example, an image quality mode or the like when performing copy processing can be selected.

Figure 16:
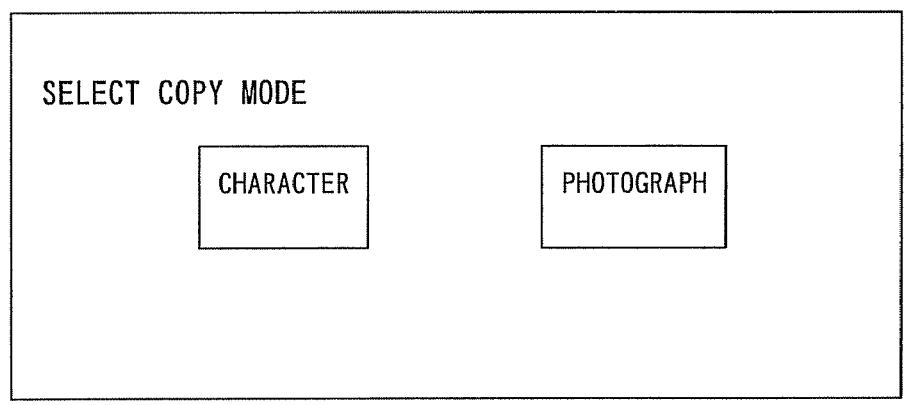
FIG. 16 is an exemplary screen display in the case of selecting an image quality mode on the control panel shown in FIG. 15.

FIG. 16 is an exemplary screen display when selecting an image quality mode on the control panel shown in FIG. 15. It is assumed that the default setting of a copy mode in the image reading apparatus M is the "character mode". The character mode is selected when the major part of the original contain characters as in the case where the original is a text or document, or when the characters are to be emphasized in reading. The type determining unit 103 determines that the image type of the original is "character" on the basis of this selection input.

Meanwhile, the "photographic mode" is selected when the major part of the original contains a photograph or illustration or when color reproducibility is to be emphasized in reading. The type determining unit 103 determines that the image type of the original is "photograph" on the basis of this selection input.

In this manner, the type determining unit 103 can determine the image quality mode (image type) of the original in accordance with the operation input to the control panel from the user.

Second Embodiment

Hereinafter, a second embodiment of the invention will be described.

This embodiment is a modification of the first embodiment. The basic configuration of the apparatus is similar to that of the first embodiment. This embodiment and the first embodiment are different in the determination method in the type determining unit.

The type determining unit 103 in this embodiment determines whether the image type of the image of the reading target is the first image type or the second image type, on the basis of the image data read by the first image reading unit 101 and the second image reading unit 102.

The image type of the original can be automatically identified, for example, by identifying whether the original is a character original or photographic original in the type determining unit while reading the image of the original in the first and second image reading units, or by reading the original to identify the original before reading the image.

Figure 17:
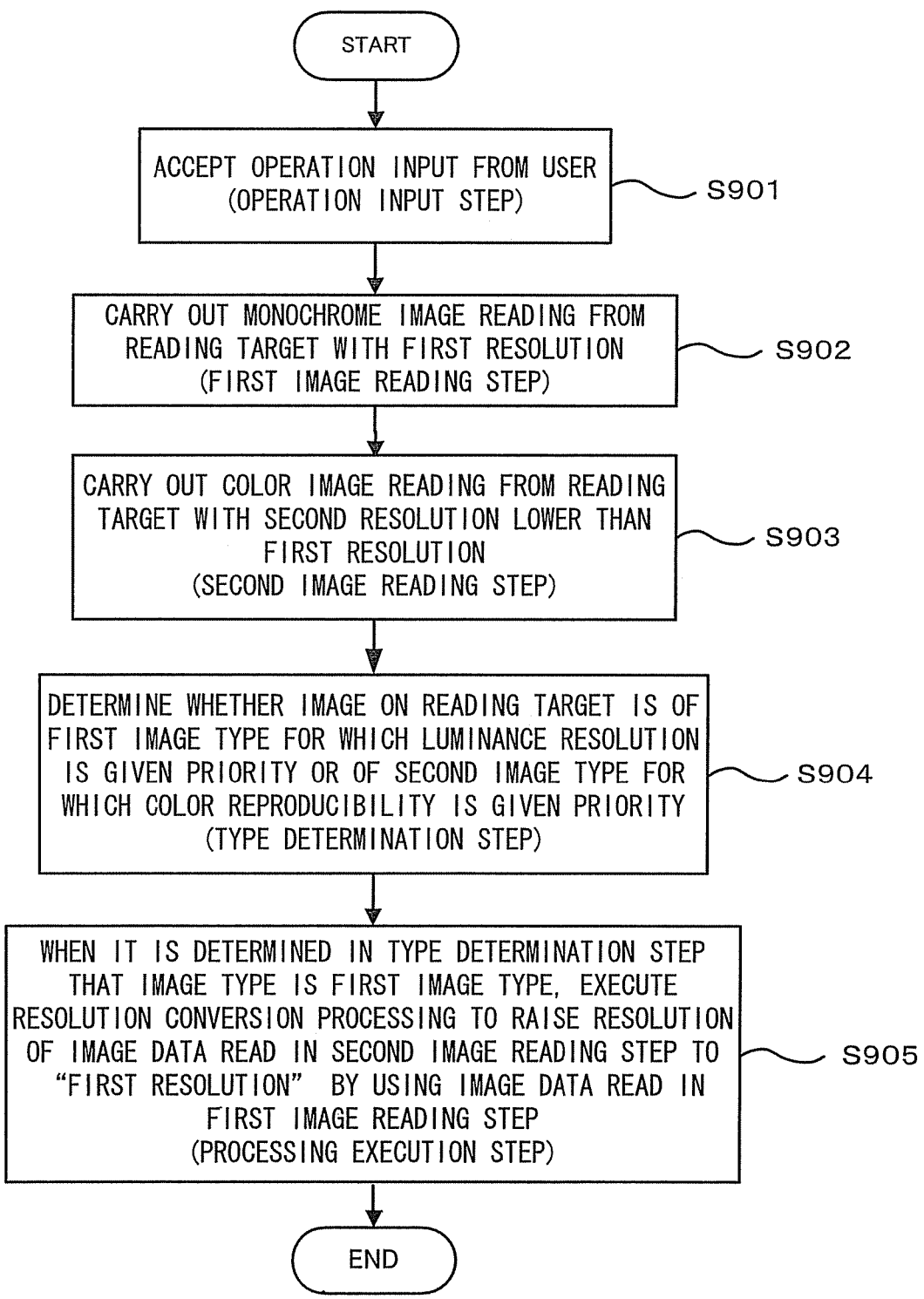
FIG. 17 is a flowchart for explaining an approximate flow of the processing in the image reading apparatus M according to each embodiment of the invention.

FIG. 17 is a flowchart for explaining an approximate flow of the processing (image reading method) in the image reading apparatus M according to each of the above embodiments.

First, the operation input unit 105 accepts an operation input from a user (operation input step) (S901). The operation input in this case is an instruction to start the original reading processing in the image reading apparatus M, an input of the setting of the image type of the original (original mode), and so on.

The first image reading unit 101 carries out monochrome image reading from a reading target with a first resolution (first image reading step) (S902).

Next, the second image reading unit 102 carries out color image reading from the reading target with a second resolution that is lower than the first resolution (second image reading step) (S903). In this embodiment, it is assumed that the image reading by the first image reading unit 101 and the image reading by the second image reading unit 102 are executed at the same time. However, the order of execution is not limited as long as both the image reading by the first reading unit and the image reading by the second image reading unit are ultimately executed.

Next, the type determining unit 103 determines whether the image on the reading target is of the first image type for which luminance resolution is given priority or of the second image type for which color reproducibility is given priority (type determination step) (S904).

In the type determination step, the image type of the image on the reading target is determined on the basis of the operation input made in the operation input step or on the basis of the image data read in the first and second image reading steps).

When it is determined in the type determination step that the image type is the first image type, the processing executing unit 104 executes resolution conversion processing to raise the resolution of the image data read in the second image reading step to the "first resolution" by using the image data read in the first image reading step (processing execution step) (S905).

Each step in the processing in the image reading apparatus is realized by causing the CPU 801 to execute an image reading program stored in the memory 802.

In the embodiments, the case where the functions to carry out the invention have already been recorded within the apparatus, is described. However, the functions are not limited to this form. The similar functions may be downloaded to the apparatus from a network, or the similar functions stored on a recording medium may be installed into the apparatus. As the recording medium, any form of medium may be employed as long as it can store programs like CD-ROM and can be read by the apparatus. Also, the functions thus acquired in advance by installing or downloading may be realized in cooperation with the operating system (OS) in the apparatus.

As described above, according to each of the embodiments, in an image input apparatus that has plural line sensors having different numbers of pixels and that combines output signals of the line sensors to form image information, the image processing is changed in accordance with the type of the original (character original, photographic original or the like) and the output resolution is changed. Thus, for a character original, processing that emphasizes resolution is performed and an image with sharp character contours can be provided. For a photographic image, the resolution is lowered, compared with the output signal of the character original, and an image in which color reproducibility is emphasized can be provided.

The invention has been described in detail by using specific embodiments, but it is obvious to those skilled in the art that various changes and modifications can be made without departing from the spirit and scope of the invention.

As described above in detail, according to the invention, in an image reading apparatus capable of converting the resolution of an image read by a color line sensor by using an image read by a monochrome sensor, a technique that realizes proper use of resolution conversion processing in accordance with the type of the image on the reading target can be provided.

What is claimed is:

1. An image reading apparatus comprising:
   a first image reading unit configured to carry out monochrome image reading with a first resolution from a reading target;
   a second image reading unit configured to carry out color image reading from the reading target, with a second resolution that is lower than the first resolution;
   a type determining unit configured to determine whether the image on the reading target is of a first image type for which luminance resolution is given priority, or of a second image type for which color reproducibility is given priority; and
   a processing executing unit configured to, when it is determined by the type determining unit that the image is of the first image type, execute resolution conversion processing to raise the resolution of image data read by the second image reading unit by using image data read by the first image reading unit.

2. The image reading apparatus according to claim 1, wherein the predetermined resolution conversion processing is processing to separate the image data read by the second image reading unit into a chromaticity signal and a luminance signal and replace the luminance signal with a luminance signal of the image data read by the first image reading unit.

3. The image reading apparatus according to claim 1, wherein an image of the first image type is an image including a character or line drawing, and an image of the second image type is an image including a photograph.

4. The image reading apparatus according to claim 1, comprising an operation input unit configured to accept an operation input from a user,
   wherein the type determining unit determines the image type of the image on the reading target on the basis of the operation input to the operation input unit.

5. The image reading apparatus according to claim 1, wherein the type determining unit determines the image type of the image on the reading target on the basis of the image data read by the first and second image reading units.

6. The image reading apparatus according to claim 1, wherein the processing executing unit executes resolution conversion processing to raise the resolution of the image data read by the second image reading unit to the first resolution by using the image data read by the first image reading unit, only when it is determined by the type determining unit that the image type is the first image type.

7. An image reading apparatus comprising:
   first image reading means for carrying out monochrome image reading with a first resolution from a reading target;
   second image reading means for carrying out color image reading from the reading target, with a second resolution that is lower than the first resolution;
   type determining means for determining whether the image on the reading target is of a first image type for which luminance resolution is given priority, or of a second image type for which color reproducibility is given priority; and
   processing executing means for, when it is determined by the type determining means that the image is of the first image type, executing resolution conversion processing to raise the resolution of image data read by the second image reading means by using image data read by the first image reading means.

8. The image reading apparatus according to claim 7, wherein the predetermined resolution conversion processing is processing to separate the image data read by the second image reading means into a chromaticity signal and a luminance signal and replace the luminance signal with a luminance signal of the image data read by the first image reading means.

9. The image reading apparatus according to claim 7, wherein an image of the first image type is an image including a character or line drawing, and an image of the second image type is an image including a photograph.

10. The image reading apparatus according to claim 7, comprising operation input means for accepting an operation input from a user,
    wherein the type determining means determines the image type of the image on the reading target on the basis of the operation input to the operation input means.

11. The image reading apparatus according to claim 7, wherein the type determining means determines the image type of the image on the reading target on the basis of the image data read by the first and second image reading means.

12. The image reading apparatus according to claim 7, wherein the processing executing means executes resolution conversion processing to raise the resolution of the image data read by the second image reading means to the first resolution by using the image data read by the first image reading means, only when it is determined by the type determining means that the image type is the first image type.

13. An image reading method comprising the step of:
    carrying out monochrome image reading with a first resolution from a reading target;
    carrying out color image reading from the reading target, with a second resolution that is lower than the first resolution;
    determining whether the image on the reading target is of a first image type for which luminance resolution is given priority, or of a second image type for which color reproducibility is given priority; and
    when it is determined in the step of determining that the image is of the first image type, executing resolution conversion processing to raise the resolution of image data read in the step of carrying out color image reading by using image data read in the step of carrying out monochrome image reading.

14. The image reading method according to claim 13, wherein the predetermined resolution conversion processing is processing to separate the image data read in the step of carrying out color image reading into a chromaticity signal and a luminance signal and replace the luminance signal with a luminance signal of the image data read in the step of carrying out monochrome image reading.

15. The image reading method according to claim 13, wherein an image of the first image type is an image including a character or line drawing, and an image of the second image type is an image including a photograph.

16. The image reading method according to claim 13, comprising the step of accepting an operation input from a user,
   wherein in the step of determining, the image type of the image on the reading target is determined on the basis of the operation input made in the step of accepting the operation input.

17. The image reading method according to claim 13, wherein in the step of determining, the image type of the image on the reading target is determined on the basis of the image data read in the steps of carrying out monochrome image reading and color image reading.

18. The image reading method according to claim 13, wherein in the step of executing, resolution conversion processing to raise the resolution of the image data read in the step of carrying out color image reading to the first resolution by using the image data read in the step of carrying out monochrome image reading, only when it is determined in the step of determining that the image type is the first image type.

* * * * *